United States Patent
Li et al.

(10) Patent No.: US 6,837,657 B2
(45) Date of Patent: Jan. 4, 2005

(54) TRAILER OF AN AUTOMATICALLY SCANNING-TYPE RADIATION INSPECTION SYSTEM FOR LARGE-SIZED OBJECT

(75) Inventors: Jianmin Li, Beijing (CN); Wenhuan Gao, Beijing (CN); Yinong Liu, Beijing (CN); Jianjun Su, Beijing (CN); Ning Li, Beijing (CN); Wanquan Shen, Beijing (CN); Rongxuan Liu, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 0 days.

(21) Appl. No.: 10/712,872

(22) Filed: Nov. 13, 2003

(65) Prior Publication Data

US 2004/0146371 A1 Jul. 29, 2004

(30) Foreign Application Priority Data

Nov. 15, 2002 (CN) ........................................ 02148669 A

(51) Int. Cl.⁷ ................................................ B60P 7/08
(52) U.S. Cl. .............................. 410/65; 410/7; 410/19; 410/30; 410/46; 410/56; 410/67
(58) Field of Search ................................ 410/7, 19, 30, 410/46, 56–57, 65, 67; 414/222, 571; 105/355, 362

(56) References Cited

U.S. PATENT DOCUMENTS

| 4,231,695 A | * | 11/1980 | Weston, Sr. .................. 410/69 |
| 4,609,313 A | * | 9/1986 | Oshino et al. ................ 410/67 |
| 4,752,167 A | * | 6/1988 | G'Geppert ...................... 410/3 |
| 4,804,302 A | * | 2/1989 | Andre ........................... 410/19 |
| 4,929,133 A | * | 5/1990 | Wiseman ....................... 410/52 |
| 4,942,828 A | * | 7/1990 | Walz et al. ................ 108/55.5 |
| 5,947,794 A | * | 9/1999 | McGrath ..................... 446/467 |
| 6,595,731 B1 | * | 7/2003 | Johansson et al. ............ 410/52 |
| 2003/0017020 A1 | * | 1/2003 | Sain ............................. 410/56 |

* cited by examiner

Primary Examiner—Stephen Gordon
(74) Attorney, Agent, or Firm—Westman, Champlin & Kelly, P.A.

(57) ABSTRACT

A trailer of an automatically scanning-type radiation inspecting system used for large-sized object, comprising a trailer body provided with a bevel portion at a tail end of a top surface thereof and positioning recesses adaptive to lower portions of front wheels of a vehicle carrying objects to be inspected respectively, a plurality of pairs of guide wheels mounted to a bottom surface of the trailer body and can be supported and run on rails, connection rods provided at front and rear ends of the bottom surface of the trailer body and used for connecting to wire ropes of winches respectively, anchoring hooks provided at front and rear ends of the bottom surface of the trailer body and used for engaging with wedges arranged on the ground, and holding means provided at front and back sides of the positioning recesses and used for holding the front wheels of the vehicle in the positioning recesses during movement of the trailer. During operation of the trailer of present invention, the trailer pulls the vehicle carrying objects to be inspected to pass through the inspection passage smoothly while the front wheels of the vehicle are held in the positioning recesses on the trailer and rear wheels thereof roll over the ground. The trailer-conveying apparatus formed by the trailer of the present invention and winches occupies less land, being low in cost, simple in structure, reasonable in design, advantageous to shield the radiation, and easy to be maintained.

4 Claims, 4 Drawing Sheets

TRAILER OF AN AUTOMATICALLY SCANNING-TYPE RADIATION INSPECTION SYSTEM FOR LARGE-SIZED OBJECT

This application claims priority of China Application Number 02148669.7, filed Nov. 15, 2002, the content of which is incorporated by reference in its entirety.

TECHNICAL FIELD OF THE INVENTION

The present invention relates to a trailing apparatus of an automatically scanning-type radiation inspection system for large-sized object, which is suitable for inspecting a medium or a light truck in the land port and a distribution center of a cargo transport station.

BACKGROUND ART OF THE INVENTION

In the prior art, there is developed a trailing-type radiation inspection system, such as inspecting systems for van container which are manufactured by Smiths Corporation of U.K. and by Aerospace Corporation of U.K. respectively from the early of 1990. In the above inspecting systems, a fixed radiation source and an array detector are arranged in an inspection passage which can shield radioactive source, the radioactive source emits X-rays of high energy and the array detector receives the X-rays passing through containers in which objects to be inspected are loaded. A vehicle carrying the containers thereon is trailed to pass through the inspection passage by a special trailing unit, when the containers on the vehicle pass through X-rays emitted by the radioactive source, the X-rays passing through the containers are transmitted to the array detector, a density distribution of the objects loaded in the containers is obtained based on variations of intensity of the X-rays, thus obtaining a perspective view of the objects loaded in the containers by converting intensity of the X-rays into gradation of image. With the trailing apparatus of the above inspecting systems, an inspection passage thereof has a length of 60 m, and two additional portions outside of both ends of the inspection passage have a length of 40 m respectively, so that the trailing unit is huge, and the land area required by the trailing unit will be equivalent to that of a soccer court. Such an inspecting system used in Wen Jin Ferry of China and imported from Germany is operated in a circularly trailing mode using three underground tractors. However, the inspecting system is very complex due to overground and underground operations of the tractors. In addition, when a tractor trails a vehicle carrying containers to be inspected, front wheels of the vehicle may slide on the tractor, which shall lead to the vehicle sliding off the tractor, thus causing impact damage to a front axle of the vehicle and strike on a guard gate of the inspecting passage. Therefore, it is known from the above that the inspecting systems in the prior art have the following disadvantages: building projects occupy a large land area, overground and underground projects are very complex, cost of the inspecting system is high, there is accident potential and it is difficult to shield the radiation and to maintain the inspecting system.

SUMMARY OF THE INVENTION

Accordingly, an object of the present invention is to provide a trailer of automatically scanning-type radiation inspecting system to overcome the above disadvantages. For the trailer according to the present invention, the land area required by building projects of an inspection passage used for shielding the radiation can be decreased, and the building projects are simple and low in cost. In addition, it is possible to prevent the accident potential from occurring. Further, it is easy to shield the radiation and to maintain the inspection system.

Additional objects, features and advantages of the present invention will be set forth in part in the description which follows and, in part, will be obvious from the description, or may be learned by practice of the invention.

To achieve the above and/or other objects of the present invention, there is provided a trailer of an automatically scanning-type radiation inspecting system used for large-sized object, the trailer comprising: a trailer body provided with a bevel portion at the tail end of the top surface thereof and positioning recesses adaptive to lower portions of front wheels of a vehicle carrying objects to be inspected respectively, said positioning recesses being formed on a transverse central portion of the upper surface of the trailer body and disposed at two sides with respect to a longitudinal central line of the upper surface; a plurality of pairs of guide wheels connected to the bottom surface of the trailer body, said guide wheels can be supported and run on rails; connection rods provided at front and rear ends of the bottom surface of the trailer body and used for connecting to wire ropes of winches respectively; anchoring hooks provided at front and rear ends of the bottom surface of the trailer body and used for engaging with wedges arranged on the ground; and holding means provided at front and back sides of the positioning recesses for holding the front wheels of the vehicle carrying objects to be inspected in the positioning recesses during movement of the trailer.

Preferably, the holding means comprises a pushing plate supported by a spring as a result of being inclined (hereinafter as "inclined state" of the pushing plate) by raising one end thereof with the spring and could be flattened (hereinafter as "flattened state" of the pushing plate) by pressing the raised end forwardly (rightward in FIG. 3) along an advance direction of the trailer; and a retaining plate which is able to be inclined and flattened (hereinafter as "inclined state and flattened state" of the retaining plate) via an urging lever and a link lever which are hinged to each other, when the wheels of the vehicle carrying objects to be inspected are held in the positioning recesses on the upper surface of the trailer body respectively, the pushing plate and the retaining plate are both in inclined states thereof so as to keep the front wheels of the vehicle in the positioning recesses stably, when an external force is applied to the urging lever, the retaining plate is flattened by the urging lever and the link lever hinged to each other so that the front wheels of the vehicle can move forwardly and leave the positioning recesses.

Preferably, the trailer body of the trailer is provided with auxiliary wheels at two sides thereof transversely, the auxiliary wheels are contacted with the ground and used for assisting to support the trailer body in a balance state.

According a preferable embodiment of the present invention, the guide wheels are of three pairs, the three pairs of guide wheels are arranged longitudinally and regularly on the bottom surface of the trailer body, and two guide wheels of each pair of guide wheels are arranged transversely on the bottom surface of the trailer body.

The trailer of the present invention together with winches forms a trailer-conveying apparatus used for the inspecting system. By comparison with the prior art, the land area required by the inspecting system is decreased and the underground building projects are significantly reduced. In addition, since all the transporting units of the trailer-conveying apparatus can be arranged within the inspection passage, no auxiliary units are required outside the inspection passage, thus decreasing the land area required by the building projects and the cost of the inspecting system. Further, the trailer of the present invention is pulled only by the winches through the wire ropes, so that it could be controlled simply and is unnecessary to detect the operations, thus reducing accidents occurring during operation of the inspecting system. Therefore, the trailer according to the present invention occupies less land, being low in cost, simple in structure and reasonable in design, advantageous to shield the radiation and easy to be maintained, thus having a bright market prospect to popularize and use widely.

BRIEF DESCRIPTION OF THE DRAWINGS

The above-mentioned features and advantages of the present invention will be more apparent by describing preferred embodiments of the present invention with reference to the accompanying drawings, in which.

THE DETAILED DESCRIPTION OF THE INVENTION

Figure 1:
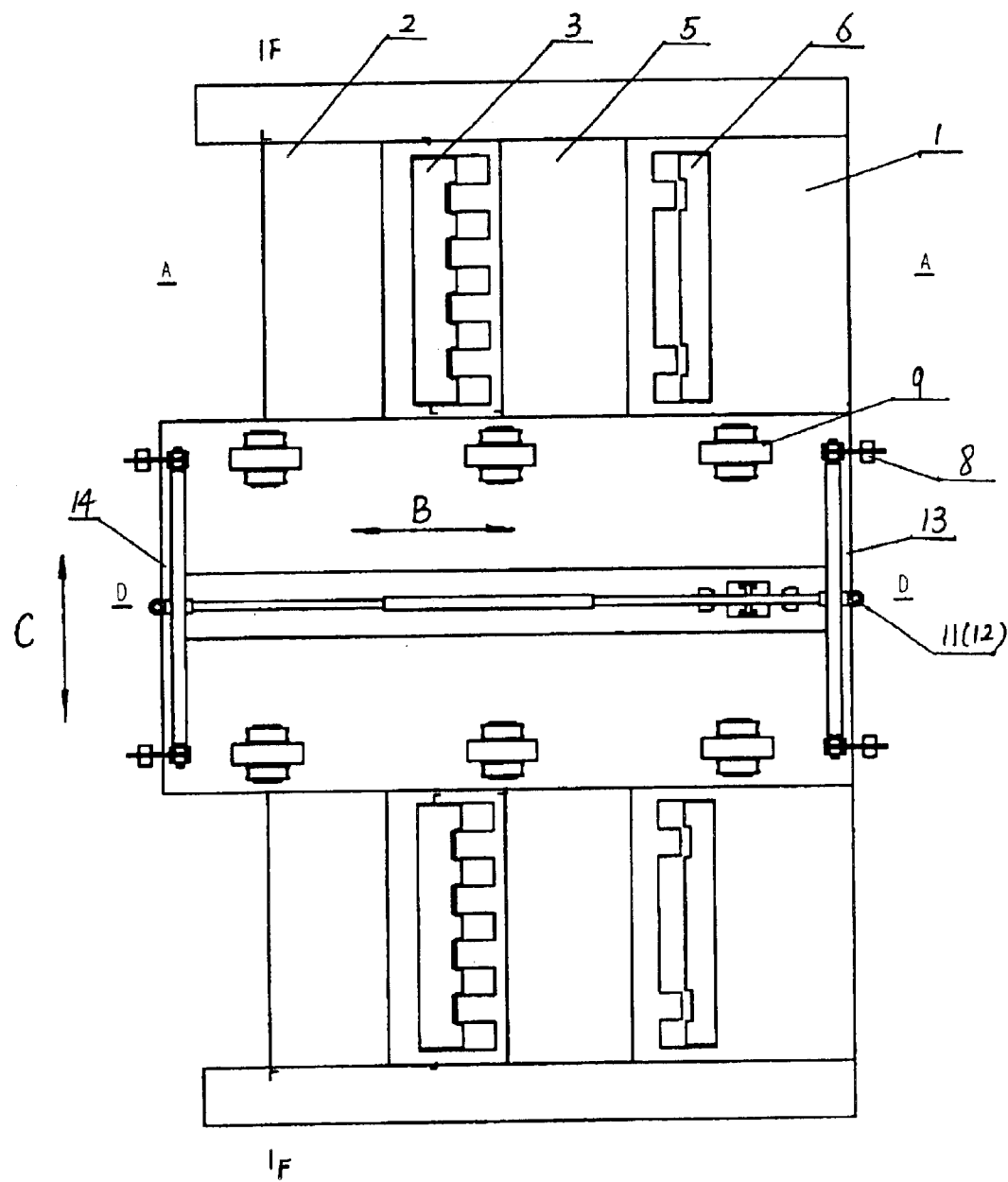
FIG. 1 is a schematic structural bottom view of a trailer according to an embodiment of the present invention.
Figure 2:
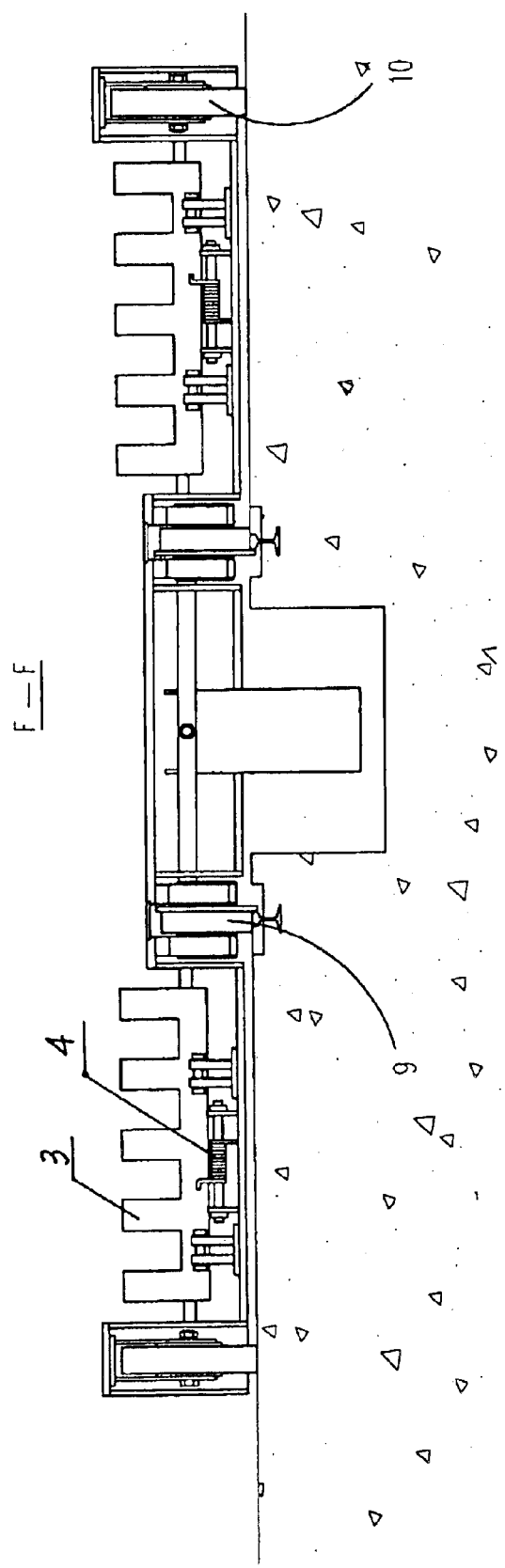
FIG. 2 is a schematic structural view taken along line F—F of FIG. 1.
Figure 3:
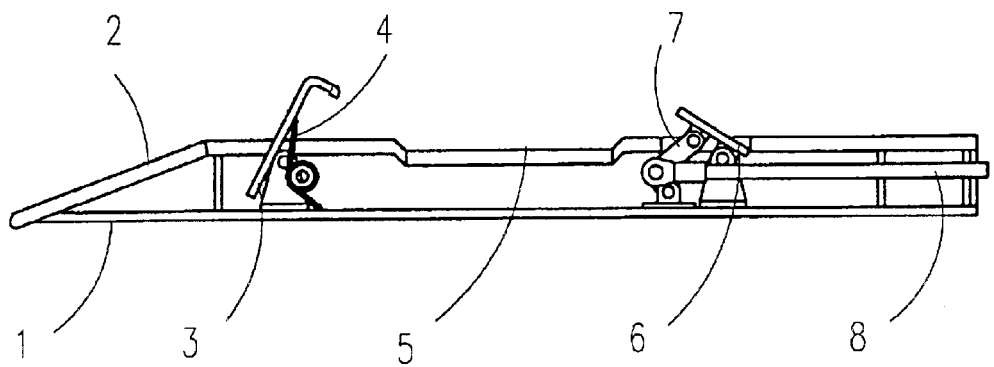
FIG. 3 is a schematic structural view taken along line A—A of FIG. 1.
Figure 4:
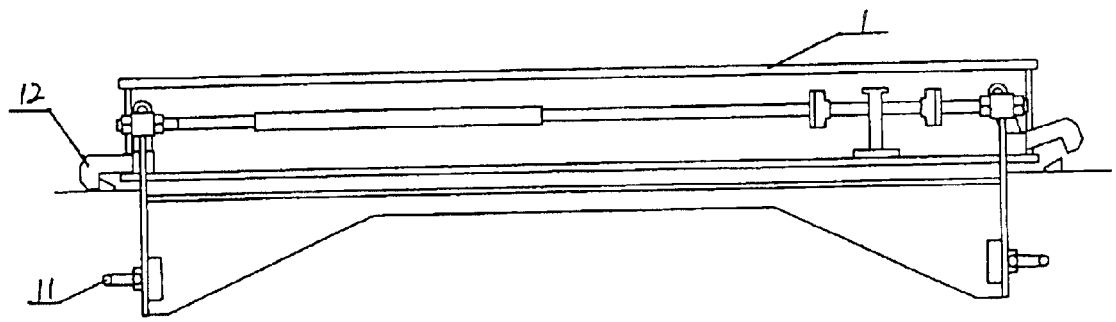
FIG. 4 is a schematic structural view taken along line D—D of FIG. 1.

The embodiments of the present invention will be explained in detail with reference to the accompanying drawings in the following.

Referring to FIGS. 1–4, a trailer according to an embodiment of the present invention comprises a trailer body 1; and three pairs of guide wheels 9 connected to the bottom surface of the trailer body 1, the three pairs of guide wheels 9 are arranged longitudinally (in directions denoted by dual-arrow B in FIG. 1) on the bottom surface of the trailer body 1 and can be supported and run on rails, in which two guide wheels of each pair of the guide wheels 9 are arranged transversely (in directions denoted by dual-arrow C in FIG. 1) on the bottom surface of the trailer body 1. Connection rods 11 are provided at front and rear ends 13 and 14 of the bottom surface of the trailer body 1 and used for connecting to wire ropes of the winches, respectively, the winches are arranged outside of an entrance 15 and an exit 16 of the inspection passage respectively. Anchoring hooks 12 are also provided at front and rear ends 13 and 14 of the bottom surface of the trailer body 1 and used for engaging with wedges arranged on the ground, respectively. The trailer body 1 is provided with a bevel portion 2 at a tail end (left end in FIG. 3) of the upper surface thereof. The trailer body 1 is also provided with positioning recesses 5 adaptive to lower portions of the front wheels of a vehicle carrying objects to be inspected, the positioning recesses 5 are formed on a transverse central portion of the upper surface of the trailer body 1 and disposed at two sides with respect to a longitudinal central line of the upper surface. On a front and rear sides of each positioning recess, there are provided a pushing plate 3 and a retaining plate 6, respectively. The pushing plate 3 is supported by a spring 4 and can be inclined ("inclined state" of the pushing plate) by raising one end thereof with the spring 4, the inclined pushing plate 3 can be flattened ("flattened state" of the pushing plate) by pressing the raised end forwardly (rightward in FIG. 3). The retaining plate 6 can be inclined and flattened ("inclined state and flattened state" of the retaining plate) via an urging lever 8 and a link lever 7 which are hinged to each other. The pushing plate 3, the retaining plate 6, the spring 4, the urging lever 8 and the link lever 7 constitute holding means for holding the front wheels of the vehicle carrying objects to be inspected in the positioning recesses 5 during movement of the trailer. Further, the trailer body 1 of the trailer is provided transversely with auxiliary wheels 10 at two sides thereof, the auxiliary wheels 10 are contacted with the ground and used for assisting to keep the trailer body 1 in a balance state. When the front wheels of the vehicle carrying objects to be inspected are held in the positioning recesses 5 respectively, the pushing plate 3 and the retaining plate 6 are all in inclined states thereof so as to hold stably the front wheels of the vehicle to be inspected in the positioning recesses 5. When an external force is applied to the urging lever 8, the retaining plate 6 in the inclined state is flattened through the urging lever 8 and the link lever 7 hinged to each other, so that the front wheels of the inspected vehicle can move forwardly (rightward in FIG. 3) and leave the positioning recesses 5.

While using the trailer of the present invention, the trailer is positioned in the inspection passage provided with the rails within a scanning area. In the inspection passage, there are provided rails 21 on which the guide wheels 9 of the trailer are supported and run. Outside of an entrance 15 and an exit 16 of the inspection passage, there are provided winches 17 and 18 respectively, wire ropes 19 and 20 of the winches 17 and 18 are connected to connection rods 11 provided at the bottom surface of the trailer body 1 respectively, there are provided wedges on the ground at the entrance 15 and the exit 16 of inspecting passage respectively, the wedges are used for engaging with anchoring hooks 12 respectively when the trailer reaches its designated positions. During operation, the pushing plate 3 of the holding means provided on the trailer body 1 of the trailer is in its inclined state, the inclined state is a natural state of the pushing plate 3, when passing the pushing plate 3, the front wheels of the vehicle carrying objects to be inspected flattens the inclined pushing plate through gravity thereof, when the front wheels fall into the positioning recesses 5 respectively, the pushing plate 3 return to its inclined state automatically, thus holding the front wheels in the positioning recesses 5 together with the retaining plate 6 which is also in its inclined state. At this time, the rear wheels of the vehicle can roll on the ground through the driving force of the trailer. The retaining plate 6 and the pushing plate 3 are all in their inclined states when the vehicle is pulled and moved by the trailer. When the trailer passes through the inspection passage to reach a designated position, an external force is applied to the urging lever 8 so as to flatten the retaining plate 6 through the link lever 7, so that the vehicle can be driven to leave the trailer. During moving of the trailer, the guide wheels 9 of the trailer run on the rails arranged on the ground, and the auxiliary wheels 10 are contacted with the ground and assist to support the trailer in a balance state. The wire ropes 19 and 20 of the winches 17 and 18 are connected to connection rods 11 respectively, thus pulling the trailer to move, when the trailer reaches the designated positions and stops, one of the anchoring hooks 12 hooks and engages automatically the corresponding one wedge, so that the trailer is held in a stable state when the vehicle moves onto or leaves the trailer.

Figure 5:
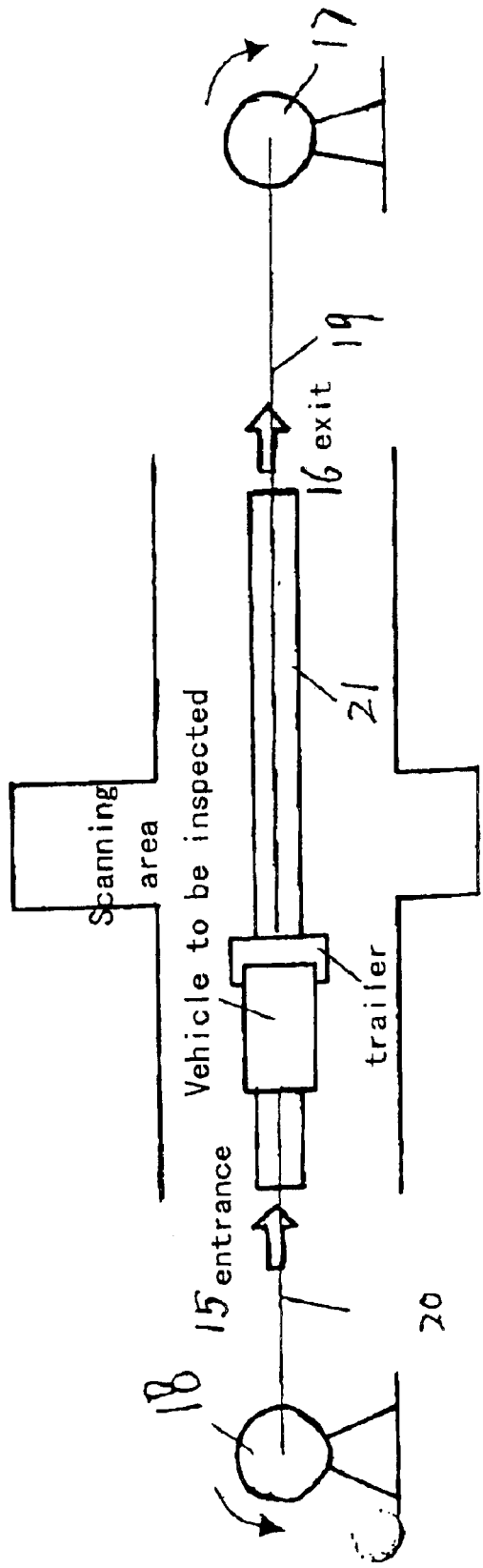
FIG. 5 is flow chart showing an operation process of an embodiment of the present invention.

Now, referring to FIG. 5, the inspecting operations using the trailer-conveying apparatus is described as following.

1. A driver of the vehicle carrying objects to be inspected drives the vehicle onto the upper surface of the trailer body 1 through the bevel portion 2 at the trail end of the trailer, the front wheels of the vehicle pass through the pushing plates 3 of the holding means and fall into the positioning recesses 5 respectively, the vehicle stops in position, then the pushing plates 3 is inclined by the springs 4, thus holding the front wheels of the vehicle stably. During the above operation, one anchoring hook 12 at rear end of the bottom surface of the trailer body 1 engages with one wedge provided at the entrance side of the inspection passage, so that the trailer is kept in a stable and stationary state.

2. The driver releases a manual brake of the vehicle before he gets off the vehicle, then he leaves the inspection passage within the scanning area.

3. An operator in an operating room presses an advance button to start up a motor of one of the winches which is arranged outside of the exit 16 of the inspection passage, so that the winch 17 is operated and the wire rope 19 of the winch 17 connected to one connection rod 11 pulls the trailer to move, the rear wheels of the vehicle roll on the ground, the trailer pulls the vehicle to pass through the scanning area smoothly so as to inspect objects carried by the vehicle.

4. The trailer brings along the inspected vehicle to the exit 16 of the inspection passage and stops by a slope provided at the exit 16.

5. The vehicle is driven off the trailer and leaves through the slope, during this operation, the other anchoring hook 12 at the front end of the bottom surface of the trailer body 1 engages with the other wedge provided at the exit side of the inspection passage, so that the trailer is kept in a stable and stationary state.

6. The trailer is pulled back to the entrance 15 of the inspection-passage by the wire rope 20 of the other winch 18 arranged outside of the entrance 15 of the inspection passage.

7. A next vehicle to be inspected is driven onto the trailer for another inspection operation flow.

In this manner, the trailer-conveying apparatus performs one operation flow. In the scanning area, there is disposed a stable portal frame which comprises collimators, transverse and upright detectors of the automatically scanning-type inspecting system. As for the other elements of the inspecting system of the present invention, they are identical with or similar to that in the prior art, so that their detailed descriptions are omitted accordingly.

Although the preferred embodiments of the present invention has been described, it will be understood by those skilled in the art that the present invention should not be limited to the described preferred embodiments. Various changes and modifications can be made within the spirit and scope of the present invention as defined by the appended claims.

What is claimed is:

1. A trailer of an automatically scanning-type radiation inspecting system used for large-sized object, comprising:

a trailer body provided with a bevel portion at a tail end of an upper surface thereof and positioning recesses adaptive to lower portions of front wheels of a vehicle carrying objects to be inspected respectively, said positioning recesses being formed on a transverse central portion of said upper surface of said trailer body and disposed at two sides with respect to a longitudinal central line of said top surface;

a plurality of pairs of guide wheels connected to a bottom surface of said trailer body, said guide wheels can be supported and run on rails;

connection rods provided at front and rear ends of said bottom surface of said trailer body and used for connecting to wire ropes of winches respectively;

anchoring hooks, provided at front and rear ends of said bottom surface of said trailer body and used for engaging with wedges arranged on the ground; and holding means provided at front and back sides of said positioning recesses and used for holding said front wheels of the vehicle carrying objects to be inspected in said positioning recesses during movement of the trailer.

2. The trailer according to the claim 1, wherein said holding means comprises a pushing plate supported by a spring said pushing plate can be inclined by raising one end thereof with said spring and be flattened by pressing said raised end forwardly along an advance direction of the trailer, and a retaining plate able to be inclined and flattened via an urging lever and a link lever which are hinged to each other, and wherein when said front wheels of the vehicle carrying objects to be inspected are held in said positioning recesses on said upper surface of the trailer body respectively, said pushing plate and said retaining plate are both in inclined states thereof so as to keep said front wheels of the vehicle in said positioning recesses stably, and when an external force is applied to said urging lever, said retaining plate is flattened by said urging lever via the link lever so that said front wheels of the vehicle can move forwardly and leave said positioning recesses.

3. The trailer according to claim 1, wherein said trailer body of the trailer is provided with auxiliary wheels at two sides thereof transversely, the auxiliary wheels being contacted with the ground and used for assisting to support said trailer body in a balance state.

4. The trailer according to the claim 3, wherein said guide wheels are of three pairs, said three pairs of guide wheels are arranged longitudinally and regularly on the bottom surface of the trailer body, and two guide wheels of each pair of said guide wheels are arranged transversely on said bottom surface of the trailer body.

* * * * *